(12) United States Patent
MacCormack et al.

(10) Patent No.: US 6,603,896 B1
(45) Date of Patent: Aug. 5, 2003

(54) POWER FIBER AMPLIFIER WITH FLAT GAIN

(75) Inventors: Stuart MacCormack, Mountain View, CA (US); David M. Giltner, Fremont, CA (US); David G. Mehuys, Sunnyvale, CA (US)

(73) Assignee: JDS Uniphase Corporation, San Jose, CA (US)

( * ) Notice: Subject to any disclaimer, the term of this patent is extended or adjusted under 35 U.S.C. 154(b) by 116 days.

(21) Appl. No.: 09/677,113

(22) Filed: Sep. 29, 2000

(51) Int. Cl.$^7$ ................................. G02B 6/28

(52) U.S. Cl. ............................ 385/24; 385/27; 385/15; 359/337.1

(58) Field of Search .................... 385/24, 27, 15, 385/30, 142; 359/337.1, 341.1; 372/6

(56) References Cited

U.S. PATENT DOCUMENTS

| | | | | |
|---|---|---|---|---|
| 5,050,949 A | * | 9/1991 | DiGiovanni et al. | ........ 359/341 |
| 5,696,615 A | * | 12/1997 | Alexander | ................. 359/134 |
| 6,362,916 B2 | * | 3/2002 | Wu et al. | ................ 359/337.1 |

* cited by examiner

*Primary Examiner*—Loha Ben
*Assistant Examiner*—M. Hasan
(74) *Attorney, Agent, or Firm*—Allen, Dyer, Doppelt, Milbrath & Gilchrist, P.A.

(57) ABSTRACT

The gain of a fiber amplifier is typically not uniform across the bandwidth used for amplifying optical communications signals. In a power fiber amplifier unit, having a fiber pre-amplifier and a fiber power amplifier, the gain tilt of the fiber power amplifier is generally set by the level of gain saturation. The gain tilt of the fiber pre-amplifier is adjustable by controlling the population inversion density in the amplifying medium. The gain tilt of the fiber pre-amplifier may be adjusted so as to at least partially compensate for the gain tilt of the power amplifier.

22 Claims, 9 Drawing Sheets

POWER FIBER AMPLIFIER WITH FLAT GAIN

FIELD OF THE INVENTION

Generally, the present invention relates to fiber optic communication systems, and particularly to fiber amplifiers for amplifying optical communications signals.

BACKGROUND

Optical fiber communications provides the capacity for transmitting large amounts of information. One way of realizing this large information handling capacity is to use wavelength division multiplexing (WDM). A WDM system uses a number of optical information channels, each channel operating at a different wavelength. Typically, each channel is generated by a separate laser source, the output from which is then modulated to carry the information. The modulated signals from different lasers is combined into one signal and is injected into a fiber link. After passing through the fiber communications system, the different channels are separated and then detected individually. Depending on the number of channels present, the bandwidth of the WDM signal can be very broad, several nm, if not tens of nm.

Optical communications systems are increasingly using fiber amplifiers for amplifying the optical communications signal, especially where the communications system transmits the optical signal over long distances. A commonly used type of fiber amplifier is the erbium-doped fiber amplifier (EDFA), where the core is doped with erbium ions. The erbium ions are excited by light from a pump laser, typically around 980 nm, passing along the fiber core. The excited erbium ions demonstrate a broad gain curve at around 1550 nm, the typical wavelength for an optical communications signal.

The erbium gain curve, however, is not flat, and so the channels of a WDM signal, spread out over a range of wavelengths, are typically amplified by different amounts in the EDFA. This is an undesirable effect: it is preferable to maintain all channels at approximately the same power level in order to maintain reliable and predictable performance. Furthermore, it is more efficient to spread the available optical power evenly among all channels, so that all channels can achieve the same minimum bit error rate (BER) without some channels having excess power.

One method of addressing the non-uniform gain of the EDFA is to use a gain flattening filter, whose loss spectrum complements the gain spectrum of the EDFA. The gain flattening filter has little loss for those channels that are amplified relatively weakly in the EDFA, but has higher loss for those channels that are amplified more. Therefore, when combined with the gain flattening filter, the EDFA may produce a spectrally flat output.

The gain flattening filter has a number of disadvantages. It introduces loss, thus reducing the overall efficiency of the optical communications system. Furthermore, the loss for each WDM channel is fixed. Therefore, the loss profile of the gain flattening filter cannot be adjusted dynamically to account for changing operating conditions.

There is a need, therefore, for a new approach to flattening the spectrum of the output from an EDFA, that avoids insertion loss and provides for dynamic adjustment.

SUMMARY OF THE INVENTION

The present invention is directed to a method and apparatus for controlling the gain tilt of a fiber amplifier, such as a pre/power fiber amplifier unit. The approach includes adjusting the gain tilt of one of the fiber amplifiers to at least partially compensate for the gain tilt in the other amplifier.

In one embodiment of the invention, a fiber amplifier system having a spectral gain characteristic, includes a first fiber amplifier having an input and an output, the first power amplifier exhibiting a first gain tilt, and a second fiber amplifier unit includes a second fiber amplifier. An output of the second fiber amplifier is coupled to the input of the first fiber amplifier. The second fiber amplifier exhibits a second gain tilt selected to compensate the first gain tilt so as to flatten the spectral gain characteristic of the amplifier system.

In another embodiment of the invention, a fiber amplifier system includes pre-amplifying means for pre-amplifying an optical signal and power amplifying means for power amplifying the pre-amplified optical signal received from the pre-amplifying means. The power amplifier system also includes means for adjusting spectral non-uniformity in the gain of the pre-amplifying means so as to flatten a spectral gain characteristic of the fiber power amplifier system.

In another embodiment of the invention, a method of operating a fiber power amplifier system, having a fiber pre-amplifier coupled to a fiber power amplifier, includes adjusting spectral non-uniformity in the gain of the fiber pre-amplifier so as to flatten a spectral gain characteristic of the fiber power amplifier system.

Another embodiment of the invention is directed to an optical information transmission system that includes an optical transmitter, an optical receiver; and an optical power amplifier unit disposed on an optical path between the optical transmitter and the optical receiver. The optical power amplifier unit includes a fiber power amplifier having an output coupled to the optical receiver and an input, the fiber power amplifier exhibiting a first gain tilt, and a fiber pre-amplifier having an input coupled to receive an input signal from the optical transmitter, and an output coupled to the input of the power amplifier. The fiber pre-amplifier exhibits a second gain tilt selected to compensate the first gain tilt so as to flatten the spectral gain characteristic of the amplifier system.

Another embodiment of the invention is directed to a fiber amplifier system that includes a pump laser emitting pump light; and a fiber amplifier coupled to absorb the pump light from the pump laser. The amount of pump light absorbed in the fiber amplifier is adjustable so as to control a gain tilt of the fiber amplifier.

The above summary of the present invention is not intended to describe each illustrated embodiment or every implementation of the present invention. Other objects and attainments, together with a fuller understanding of the invention will become apparent and appreciated by referring to the following description and claims taken in conjunction with the accompanying drawings.

BRIEF DESCRIPTION OF THE DRAWINGS

The invention may be more completely understood in consideration of the following detailed description of various embodiments of the invention in connection with the accompanying drawings, in which.

Figure 1:
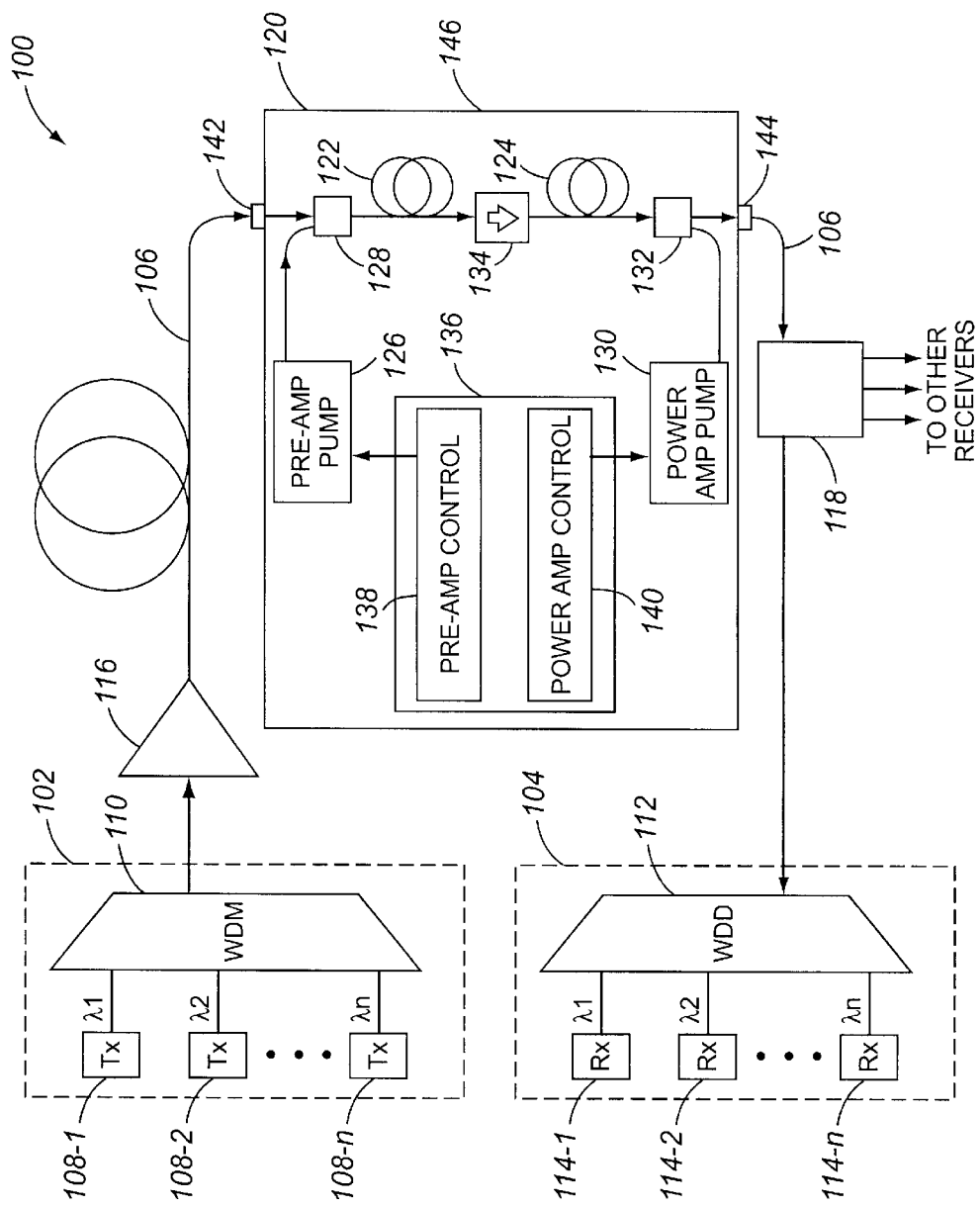
FIG. 1 schematically illustrates an embodiment of an optical fiber communications system according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

While the erbium-doped fiber amplifier (EDFA) is useful for amplifying a wavelength division multiplexed (WDM) optical signal, in part because of the broad gain bandwidth of the erbium ion, the gain of the EDFA is typically not uniform over the bandwidth of a WDM signal. Thus, without additional steps being taken, the channels of a WDM signal amplified in an EDFA have non-uniform power levels. Gain flattening filters have been used to reduce this non-uniformity. However, gain flattening filters introduce loss to the optical signal and do not provide for dynamic adjustment.

The subject invention is a new approach to compensating for the non-uniformity of the gain profile of an EDFA. The subject invention avoids introducing loss to the optical communications signal and permits for dynamic adjustment of the compensation, and so is useful where the operating conditions change so as to change the spectral non-uniformity of the amplifier.

One particular embodiment of the invention is illustrated schematically in FIG. 1 which shows a fiber-based optical communications system 100 having a transmitter unit 102 and a receiver unit 104 coupled by a fiber communications link 106. The system 100 may be based on the use of a single wavelength, or may be based on the use of multiple wavelengths of light. A common approach to using multiple wavelengths of light, referred to as wavelength division multiplexing (WDM), is to multiplex signals at various different optical frequencies, or channels, into a single multiplexed signal at a transmitter end and to demultiplex the various components at the receiver end. Typically, the frequency spacing between channels is constant. Dense WDM (DWDM) systems may also be used. As used herein, the abbreviation "WDM" includes DWDM.

The communications system 100 may be a WDM system, and the transmitter unit 102 may include a number of semiconductor laser transmitters 108-1,108-2, . . . 108-n operating at different wavelengths $\lambda 1, \lambda 2, \ldots, \lambda n$ respectively to produce the different optical channels. The laser transmitters 108-1,108-2, . . . 108-n may also each be provided with modulators to modulate the signal on each respective channel. The laser transmitters typically operate at a wavelength of around 1550 nm, although communications at other wavelengths are also possible. According to International Telecommunications Union (ITU) standards, the frequency separation between channels is uniform, and may be 200 GHz, 100 GHz, or 50 GHz. The light output from each laser transmitter 108-1,108-2, . . . 108-n is combined in a wavelength division multiplexer (WDM) 110 for transmission through the fiber link 106. After propagating through the fiber link 106, the multiplexed optical signal is received at the receiver unit 104. The light is split into its different wavelength components $\lambda 1, \lambda 2, \ldots, \lambda n$ in a wavelength division demultiplexer (WDD) 112, and each wavelength component is detected by a respective receiver 114-1, 114-2, . . . , 114-n. The fiber link 106 may include multiple fibers, although only a single fiber is considered in the following description, for clarity.

Transmission losses within a fiber may result in a reduction in the signal strength as the signal propagates between the transmitter 102 and the receiver 104. Optical fiber amplifiers 116 are typically positioned along the fiber link 106 so that the signal, when it reaches the receiver unit 104, is sufficiently strong to reduce errors to an acceptable level. This can be accomplished by adding fiber amplifiers 116 in series along the communications fiber link 106 until the destination is reached. Two types of fiber amplifier are commonly used. One type of amplifier is based on the use of a rare-earth doped fiber: erbium doped fiber amplifiers (EDFAs) are finding increasing use in fiber communications for amplifying optical signals at around 1550 nm. Another type of amplifier is a fiber Raman amplifier (FRA), which uses Raman gain to amplify the optical signal.

It will be appreciated that the numbers and types of amplifiers disposed along the fiber communications link 106 are dependent on the particular needs of that link 106. Accordingly, the numbers and types of amplifiers may differ from that shown in FIG. 1. The number of amplifier units 116 may be increased or decreased as necessary to obtain an acceptable bit error rate (BER) at the receivers. The power level of a fiber communications signal that is subsequently distributed among a number of parallel receiver units 104, as occurs with the distribution of cable television signals for example, may be required to be higher than the power level of a signal that is received by only a single receiver unit 104, for example with telecommunications.

A splitter 118 may be placed after the power amplifier unit 120 for splitting the amplified signal from the power amplified unit 120 among a plurality of receivers 104. For example, the fiber link 106 may carry cable television signals, and the receiver unit 104 may be situated in a home as a television receiver. The power amplifier unit 120 is useful for amplifying the television signal to a high level before distributing the signal to number of receiver units 104. In particular, a higher output from the power amplifier unit 120 results in a larger number of receiver units 104 being served from a single amplifier, which reduces overall system costs. Thus, although the signal may be received by more than one receiver unit 104, only one receiver unit 104 is illustrated for clarity.

The power amplifier unit 120 may be an erbium-doped, power fiber amplifier (EDPFA) unit 120, which is a type of EDFA. The EDPFA unit 120 typically includes a pre-amplifier 122 followed by a power amplifier 124. The pre-amplifier 122 typically provides high gain, raising the power of the optical communications signal from a low level to a high level. However, since the signal entering the pre-amplifier 122 is low, the signal typically does not reach a power level high enough to saturate the pre-amplifier 122 until it is close to the output of the pre-amplifier 122. Therefore, the power extraction efficiency from the pre-amplifier 122 is low. The pre-amplified communications signal then enters the power amplifier 124. Since the power level of the communications signal is typically relatively high upon entering the power amplifier 124, the communications signal may quickly saturate the power amplifier gain to efficiently extract the power stored in the power amplifier 124.

The fiber pre-amplifier 122 is pumped by a pre-amplifier pump laser 126, typically a semiconductor laser whose output is set at a wavelength readily absorbed by the fiber pre-amplifier 122. Where the fiber pre-amplifier uses doped erbium as the amplifying species, the pump wavelength is commonly set at about 980 nm. The pump light from the pre-amplifier pump laser 126 may be coupled into the pre-amplifier 122 via a WDM coupler 128, or some other suitable type of coupler. The pump light from the pre-amplifier pump laser 126 typically propagates within the pre-amplifier 122 in the same direction as the signal to the amplified, and is said to co-propagate.

The power amplifier 124 is pumped by a power amplifier pump laser 130, typically a semiconductor laser. Like the preamplifier, where erbium-doped glass is used as the amplifying medium, the wavelength of the output from the power amplifier pump laser 130 is typically about 980 nm. The pump light from the power amplifier pump laser 130 may be coupled into the power amplifier 124 via a WDM coupler 132, or some other suitable type of coupler The pump light from the power amplifier pump laser 130 typically propagates within the power amplifier 124 in the direction opposite to that of the signal to the amplified, and is said to counter-propagate.

An isolator 134 may be positioned between the pre-amplifier 122 and the power amplifier 124 to prevent the propagation of signals backwards from the power amplifier 124 into the pre-amplifier 122. Such signals might reduce the gain of the pre-amplifier 122, resulting in a reduction of the performance of the EDPFA unit 120.

The pump lasers 126 and 130 may each be attached to a control unit 136 which includes a pre-amplifier controller 138 coupled to the pre-amplifier pump laser 126 controller and a power amplifier controller 140 coupled to the power amplifier pump laser 130. Each controller 138 and 140 may include a power supply, providing and controlling current directed to the respective pump lasers 126 and 130. Each controller 138 and 140 may also include a thermal controller to stabilize the operating temperature of the respective pump lasers 126 and 130. For example, the pump lasers may each include a semiconductor laser element thermally coupled to a thermoelectric cooler that is operated by the respective thermal controller, to cool the laser element to a specific operating temperature.

The EDPFA unit 120 may be provided in its own enclosure 146 that includes the fiber amplifiers 122 and 124, the pump lasers 126 and 128, along with the control unit 136. The EDPFA unit 120 may include an input coupling port 142 that is coupled to the input to the fiber pre-amplifier 122, for receiving the communications signal to be amplified from the fiber communications link 106. The EDPFA unit 120 may also include an output coupling port 144 that is coupled to the output from the fiber power amplifier 124, for connecting the high power signal from the fiber power amplifier 124 to the communications link 106.

Figure 2:
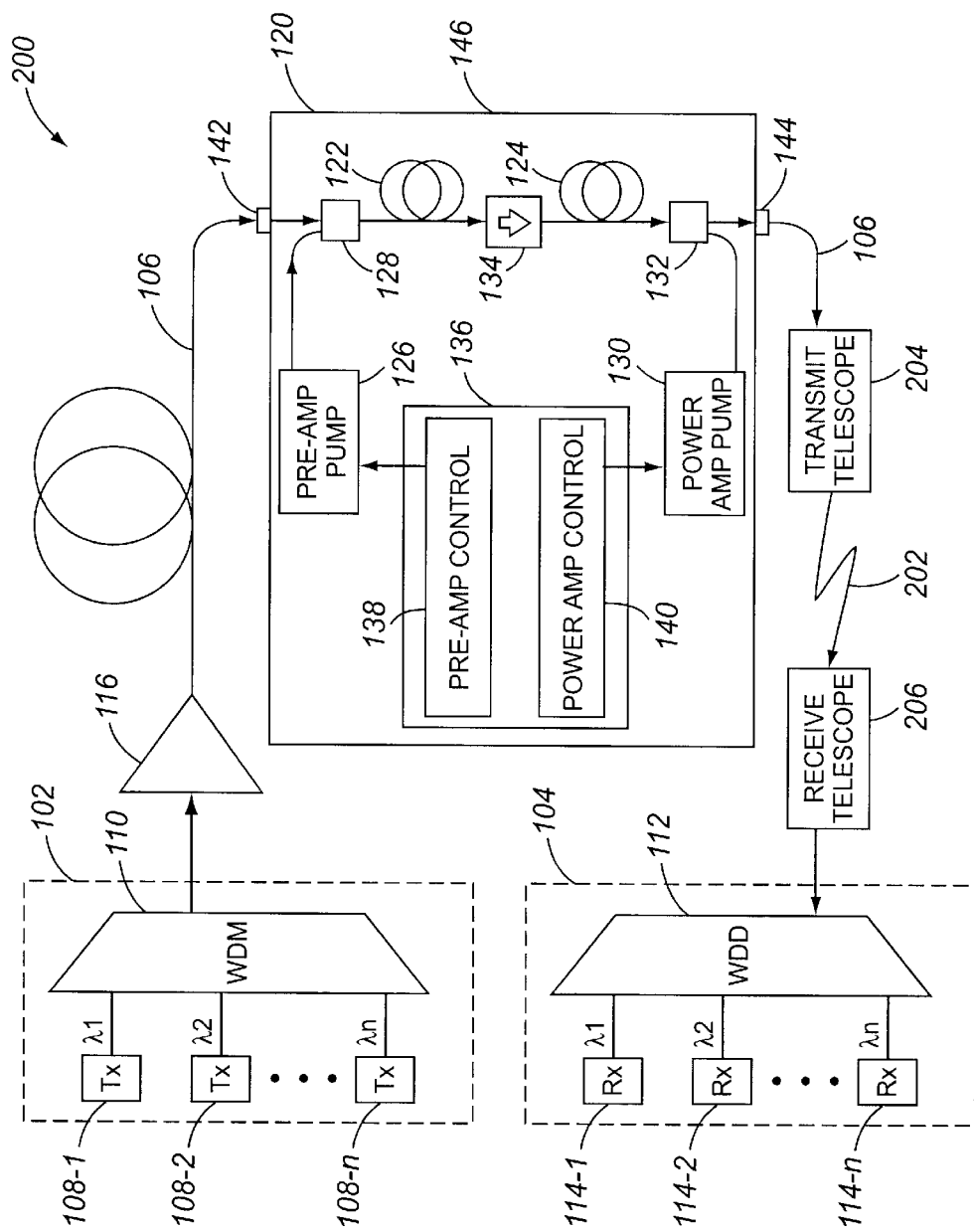
FIG. 2 schematically illustrates another embodiment of a communications system according to the present invention.

Another embodiment of a communications system 200 that uses an EDPFA unit 120 is illustrated in FIG. 2. This particular embodiment of communications system 200 is a hybrid system in that it includes a fiber communication link 106 as well as a free-space optical link 202. The high power signal is directed from the EDPFA unit 120 to a transmitting telescope 204, which transmits the high power communications along the free-space optical link 202 to a receiving telescope 206. The signal received at the receiving telescope 206 is directed to the receiver unit 104 for de-multiplexing and detection.

The fiber power amplifier 124 may use a single core, single mode fiber, where the pump light from the power amplifier pump laser 130 is carried within the single core of the fiber, which is typically less than 10 $\mu$m in diameter. However, high coupling efficiency from the power amplifier pump laser 130 to a single mode core is difficult to achieve for high pump powers, of the order of 1 W or more. This is because high coupling efficiency requires that the output from the power amplifier pump laser be highly focusable. However, reliable operation at high power typically demands a large emitting area on the surface of the laser, in order to reduce surface damage. A large emitting area leads to reduced focusability unless special steps are taken, such as using a laser that has a master oscillator/power amplifier configuration. Such additional steps taken to improve the focusability of the laser output usually increase the complexity of the system, reducing reliability and increasing costs.

On the other hand, broad area, high power semiconductor lasers are relatively inexpensive and can readily be used to pump a double-clad fiber amplifier. A double-clad fiber amplifier includes a single mode, inner core that carries the communications signal to be amplified. The single mode, inner core is typically doped with an amplifying species, such as erbium. The diameter of the inner core is less than about 10 $\mu$m, in order to operate as a single mode waveguide. An inner cladding, having a refractive index less than the inner core, surrounds the inner core. The inner cladding may have a cross-sectional dimension in the range of a few tens of microns to hundreds of microns. An outer cladding, having a refractive index less than the refractive index of the inner cladding, surrounds inner cladding core.

Pump light may be injected from a broad area power amplifier pump laser 130 into the inner cladding of the double-clad fiber amplifier with high efficiency, since the dimension of the inner cladding is so large. The pump light propagates along the inner cladding and, since the inner cladding surrounds the relatively small inner core, the pump light also passes along the inner core, where it is absorbed for pumping the amplifier.

However, the cross-sectional areas of the inner core and inner cladding are very different, and so the fraction of pump power that enters the inner core is small, which reduces the amount of pump power absorbed per unit length of amplifier fiber. Consequently, it is common to include ytterbium doping in the inner core of a double-clad fiber. Ytterbium has an absorption cross-section that is approximately 1 times larger than erbium, and is also efficient at transferring absorbed optical energy to the co-doped erbium in an ion-ion interaction. Thus, the fiber power amplifier 124 may be a double-clad fiber having an Er/Yb doped inner core, and the power amplifier pump laser 130 may be a relatively inexpensive high power semiconductor laser having a large area emitter coupled to the inner cladding of the fiber.

An important characteristic of a fiber amplifier system is that all WDM channels are amplified by approximately the same amount, in order that all channels are kept at approximately the same intensity, and noise levels in all channels are equal. This requires that the gain of the fiber amplifier system demonstrate a relatively uniform spectral gain characteristic. The spectral gain characteristic is the frequency dependence of the amplifier gain, and is typically considered over the bandwidth of interest.

Figure 3:
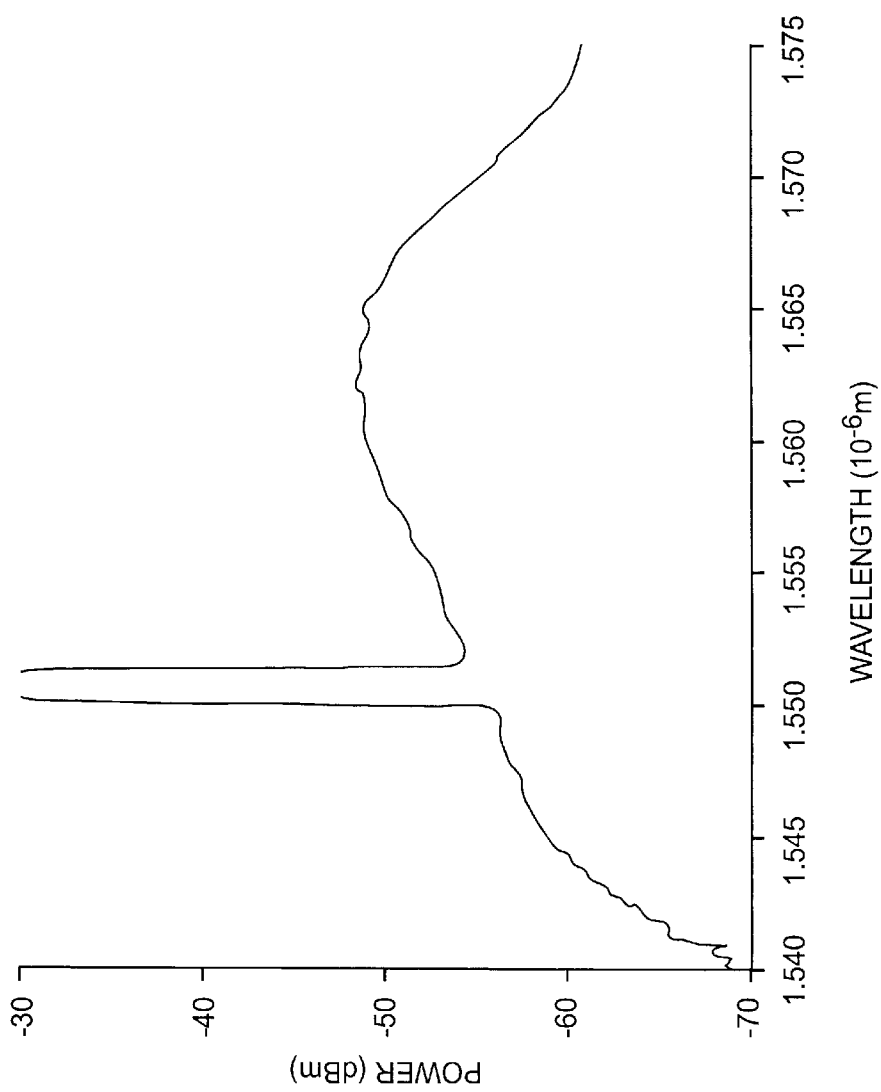
FIG. 3 illustrates a graph showing output from a strongly saturated erbium fiber amplifier.

A power fiber amplifier is typically operated in a highly saturated state, and so the amplifier is in a state of relatively weak population inversion. When the inversion population is weak, erbium amplifiers operating at about 1550 nm exhibit a positive gain tilt, which means that the gain is higher for longer wavelengths than for shorter wavelengths. The gain tilt is caused by an absorption at the shorter wavelengths. This effect is illustrated in FIG. 3, which shows the output from a strongly saturated Er/Yb double-core fiber amplifier. The broad peak between 1540 nm and 1575 nm is the amplified spontaneous emission emitted by the amplifier when strongly saturated by a communications signal at about 1550 nm. It can be seen in FIG. 3 that the gain of the Er/Yb fiber amplifier, under strong saturation, increases for longer wavelength between about 1540 nm and 1560 nm.

The positive gain tilt exhibited by the Er fiber power amplifier 124 contributes to a non-uniformity in the spectral gain characteristic of the amplifier system 120. One common approach to overcoming the non-uniformity in the gain spectral characteristic is to insert a gain flattening filter between the fiber pre-amplifier 122 and the fiber power amplifier 124.

The present invention is directed to a different approach for compensating for the non-uniformity in the spectral gain characteristic of the fiber amplifier system 120. Advantages provided by the present invention include avoiding the introduction of losses into the optical system and also providing dynamic control that permits adjustment of the compensation to account for changing operation conditions. The present invention is directed to introducing a negative gain tilt, in other words an increased gain for shorter wavelengths, in the fiber pre-amplifier 122. The negative gain tilt at least partially compensates the positive gain tilt of the fiber power amplifier 124. Thus, the shorter wavelengths experience a higher gain in the preamplifier than the longer wavelengths, but experience a lower gain in the power amplifier than the longer wavelengths.

Figure 4:
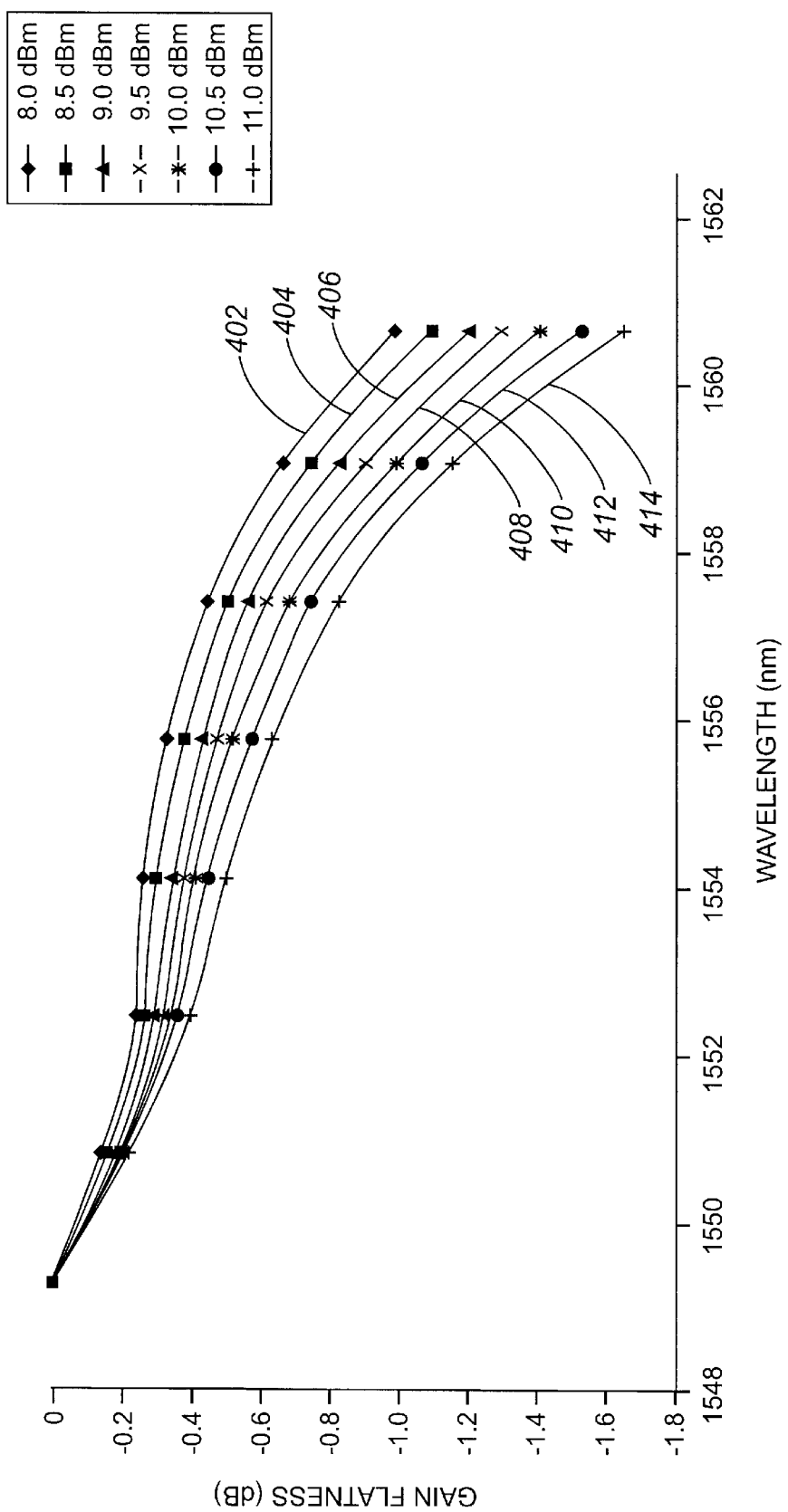
FIG. 4 illustrates a graph showing the gain of an erbium fiber pre-amplifier as a function of wavelength, for various levels of population inversion.

The negative gain tilt of the pre-amplifier 122 is illustrated in FIG. 4, which shows a graph 400 of relative gain (dB) exhibited by the fiber pre-amplifier plotted against wavelength, for eight channels in the wavelength range 1549 nm–1560.5 nm. The relative gain is shown normalized to the gain for the first channel at 1549 nm. The relative gain is shown in seven curves 402–414 for different values of output power (dBm) from the fiber pre-amplifier 122 for a uniform input power of –3 dBm. The output power characteristic of each curve 402–414 is listed in Table I. It will be appreciated that, for a given input power, the output power level is related to the amplifier's population inversion created by the pre-amplifier pump laser 126.

TABLE I

| Pre-Amplifier Output Power Level | |
|---|---|
| Curve No. | Power (dBm) |
| 402 | 8.0 |
| 404 | 8.5 |
| 406 | 9.0 |
| 408 | 9.5 |
| 410 | 10.0 |
| 412 | 10.5 |
| 414 | 11.0 |

Graph 400 shows that the shorter wavelengths of the wavelength range experience higher gain than the longer wavelengths. Furthermore, the angle of the tilt, in other words the degree of non-uniformity of the spectral characteristic of the fiber pre-amplifier, increases with increasing pump power. Thus, the degree of negative tilt exhibited by the fiber pre-amplifier 122 may be adjusted by altering the pump power delivered to the fiber pre-amplifier 122 from the pre-amplifier pump laser 126.

The experimental results summarized in FIG. 4 were obtained using a fiber pre-amplifier 122 having a length of 7.8 m. This value of the fiber pre-amplifier length differs considerably from the optimum length of fiber pre-amplifier that would be used to maximize output power from the fiber amplifier system 120. In fact, the length of the fiber pre-amplifier 122 that produces a compensating negative gain tilt is significantly shorter than the length of fiber pre-amplifier that would be used in a power-optimized system, perhaps only one-half the length.

Figure 5:
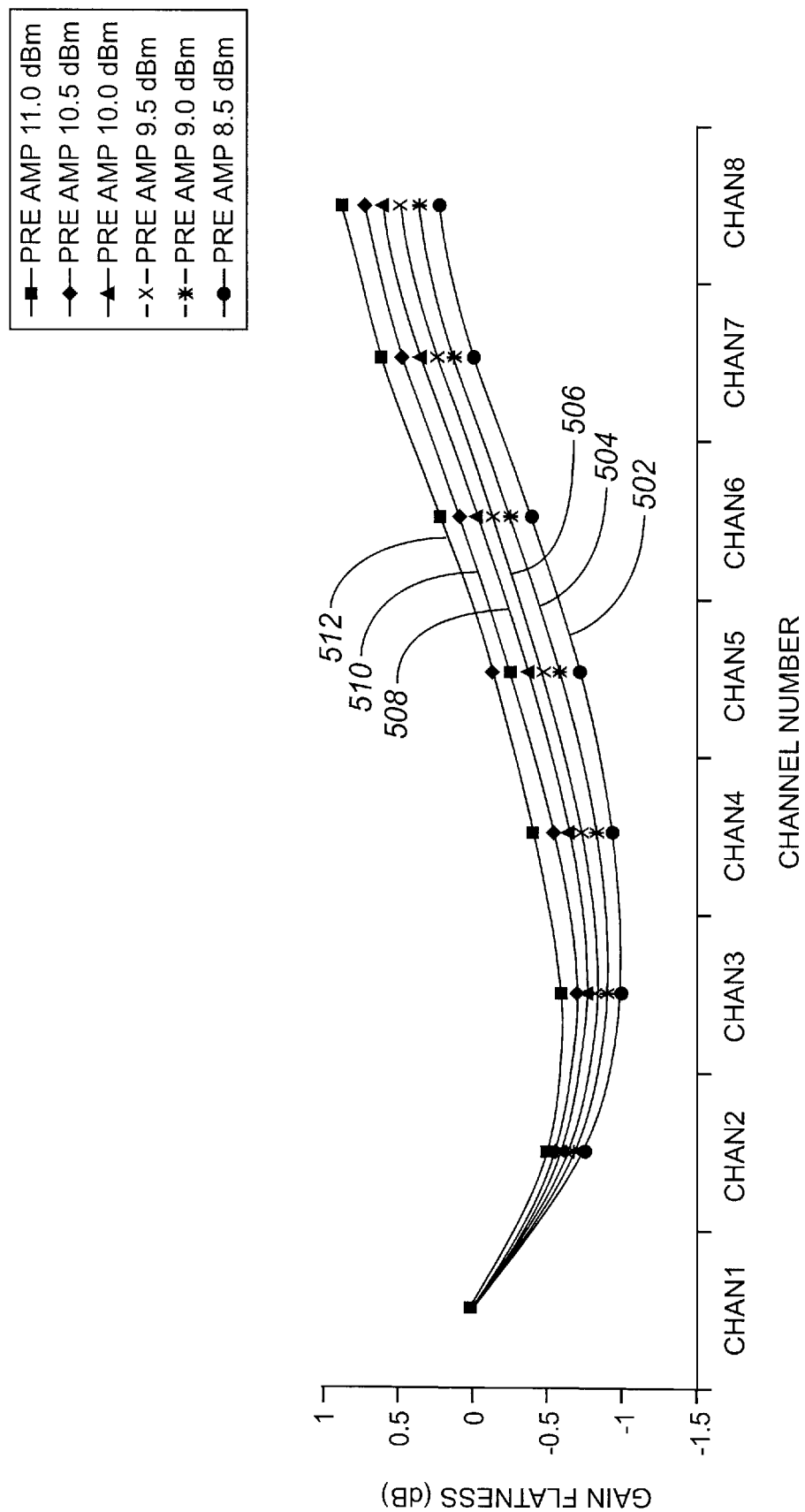
FIG. 5 illustrates a graph showing the multi-channel output spectrum from a tilt-compensated power fiber amplifier system according to an embodiment of the present invention, for various levels of pre-amplifier population inversion.

The ability of the negative tilt produced by the fiber pre-amplifier 122 to compensate the positive tilt produced by the fiber power amplifier 124 is confirmed in FIG. 5, which shows a graph 500 of the gain flatness of the output from an eight channel power amplifier unit. The channels were evenly spaced over a wavelength range of 1549 nm to about 1560.5 nm. The amplifier gain for each channel is shown normalized to the gain for channel 1. The six curves 502–512 represent the gain flatness for different levels of output power from the fiber pre-amplifier. The fiber pre-amplifier output power level for each curve 502–512 is listed in Table II.

TABLE II

| Pre-amplifier Output Power Level | |
|---|---|
| Curve No. | Power (dBm) |
| 502 | 8.5 |
| 504 | 9.0 |
| 506 | 9.5 |
| 508 | 10.0 |
| 510 | 10.5 |
| 512 | 11.0 |

Since the input to the fiber pre-amplifier was constant, each of the curves 502–512 may be understood to represent different levels of pump power delivered to the fiber pre-amplifier. All the curves 502–512 show a gain flatness of ±1 dB or less, with curve 510 showing a flatness of around 0.7 dB over all channels.

The magnitude of the negative gain tilt of the fiber pre-amplifier depends primarily on the magnitude of the population inversion density in the fiber pre-amplifier. A strongly inverted pre-amplifier produces a more pronounced negative gain tilt. Various approaches to producing a high population inversion are available and may be used independently or in combination. For example, the length of the erbium-doped fiber used in the fiber pre-amplifier may be kept relatively short so that the pump fluence remains high along the entire fiber length. Also, the pre-amplifier pump source preferably produces a high power output that is efficiently couplable into the fiber pre-amplifier, and the wavelength of the pump signal is tuned close to the erbium absorption peak of 976 nm for strong absorption. Furthermore, the fiber pre-amplifier may be pumped from both its input and output ends so as to increase the effective pump intensity.

Figure 6:
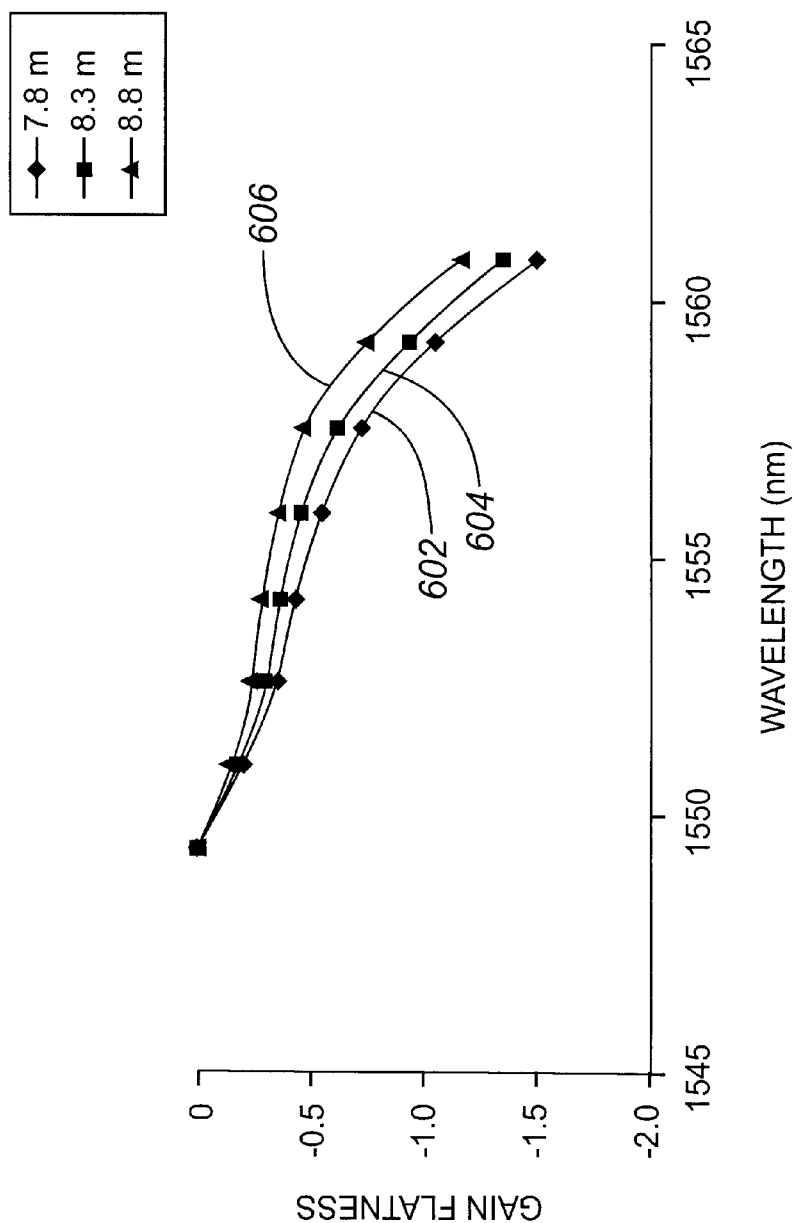
FIG. 6 illustrates a graph showing the gain of an erbium fiber pre-amplifier as a function of wavelength, for various lengths of fiber pre-amplifier.

The reduction of gain tilt with reduced population inversion density is illustrated in FIG. 6, which shows graph 600 of gain flatness plotted against channel wavelength for eight channels evenly spaced over the wavelength range 1549–1560.5 nm. The three curves 602–606 represent different lengths of fiber amplifier, as listed in Table III. The signal input power to the amplifier (−3 dBm) and the signal output power from the amplifier (10.5 dBm) were the same for each curve 602–606.

TABLE III

Fiber Amplifier Length

| Curve No. | Amplifier Length (m) |
| --- | --- |
| 602 | 7.8 |
| 604 | 8.3 |
| 606 | 8.8 |

The longer fiber lengths had reduced population inversions, since the outputs from all lengths of fiber amplifier were constant. The gain tilt reduced by approximately 0.1 dB for each 0.5 m of length of fiber.

The fiber pre-amplifier may be pumped from both ends by having a first pump laser coupled to pump light into the input end of the fiber pre-amplifier, and a second pump laser coupled to pump light into the output end. Since the fiber pre-amplifier advantageously has a short length with a high population inversion density along its length, a large fraction of the pump power from a pump laser is not absorbed in the pre-amplifier. Accordingly, a more efficient approach to pumping the pre-amplifier from both ends is to reflect the pump light transmitted through the pre-amplifier, so that the reflected light experiences a second pass through the amplifier.

Figure 7:
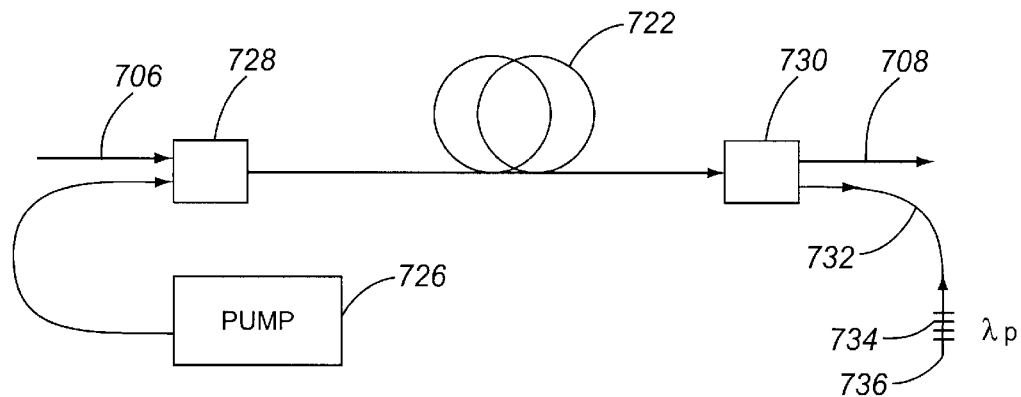
FIG. 7 schematically illustrates an embodiment of a pumping arrangement for a fiber pre-amplifier according to the present invention.

One embodiment of an approach to reflecting pump light is illustrated in FIG. 7. The signal to be amplified enters the pre-amplifier 722 through an input fiber 706. Pump light for pumping the pre-amplifier 722 is generated in the pump laser 726 and is combined with the signal to be amplified in the combiner 728. After passage through the pre-amplifier 722, the amplified signal is separated from the transmitted pump light in a splitter 730, which may be a wavelength division demultiplexer. The amplified signal passes along output 708 and the transmitted pump light is passed into a reflector fiber 732. The reflector fiber 732 is provided with a reflector 734 that reflects the transmitted pump light back through the splitter 730 to the pre-amplifier 722, where a portion is absorbed. The reflector 734 may be a fiber Bragg grating, or may be some other type of reflector, for example a reflective coating on the end 736 of the reflector fiber 732, or an external reflector.

One important advantage of the present invention is that it permits dynamic adjustment of the gain flatness of an amplifier unit. Gain-flattening filters provide a loss mechanism within the fiber that compensates for non-uniformity in the spectral characteristic of an amplifier. However, the loss mechanism is static, and cannot easily be adjusted, without replacing the entire gain-flattening filter. The present invention, on the other hand, permits dynamic adjustment of the gain tilt compensation by adjusting the pre-amplifier pump laser.

Figure 8:
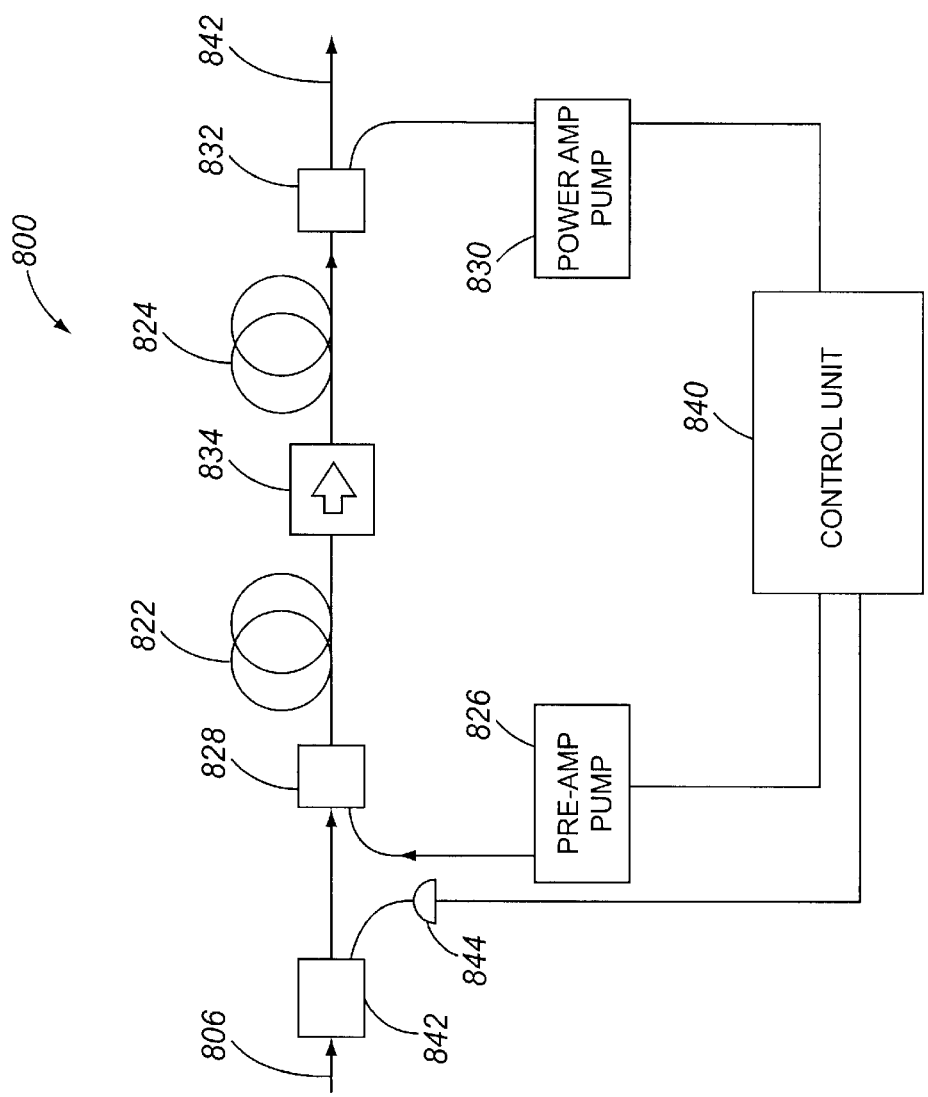
FIG. 8 schematically illustrates an embodiment of a fiber power amplifier unit according to the present invention that provides dynamic adjustment of the tilt compensation.

A first embodiment of a power amplifier unit 800 that provides dynamic gain flattening adjustment is illustrated in FIG. 8. The signal to be amplified enters the power amplifier unit 800 by way of the input 806. A pre-amplifier pump laser 826 generates pump light that is combined with the signal in combiner 828, so that both the signal and the pump light enter the fiber pre-amplifier 822. After being amplified in the fiber pre-amplifier 822, the signal passes through an isolator 834 and then enters the fiber power amplifier 824, which is typically counter-pumped by pump light from the power amplifier pump laser 830. The pump light from the power amplifier pump laser 830 is coupled into the fiber power amplifier 824 by combiner 832. The power amplified signal leaves the power amplifier unit 800 via the output 842.

A splitter 842 is disposed at the input 806 to tap off a fraction of the input signal, which is directed to a detector 844. The detector 844 may be any suitable detector that detects amplitude of the incoming signal, for example a photodiode. The detector 844 is coupled to the control unit 840 which controls operation of both the pump lasers 826 and 830, and also controls the gain tilt of the fiber pre-amplifier 822. If the amplitude of the input signal varies, the degree of saturation of the power amplifier 824 may vary, thus changing the positive tilt that is caused by the fiber power amplifier 824. When the control unit 840 detects a change in the amplitude of the incoming signal, the control unit 840 changes the negative tilt imposed by the fiber pre-amplifier 822 by a corresponding amount, so as to compensate for the change in the positive tilt.

The detector 844 may also detect the tilt of the incoming signal to be amplified. In one embodiment, the detector 844 may include a WDM demultiplexer to separate different channels of the incoming signal, and then detect amplitudes of two or more of the different channels. For example, where there are N channels, the detector 844 may measure the amplitudes of the first and Nth channels. The ratio of the two amplitudes may be taken as a measure of the tilt of the incoming signal. It will be appreciated that the amplitudes of any combination of channels may be used as a measure of flatness of the incoming signal. In one approach, a channel monitor, for example SDL Queensgate model no. M-03.1000 Series Optical Performance Monitors, may be used as the detector 844 to measure the amplitudes of all the channels.

A change in the tilt of the incoming signal may arise, for example, from a change in the performance in a preceding component in the fiber system to which the power amplifier unit 800 is attached. The control unit 830 may change the negative tilt imposed by the fiber pre-amplifier 822 to compensate for the change in tilt of the incoming signal, thus ensuring a spectrally flat output amplified WDM signal at the output 842.

Figure 9:
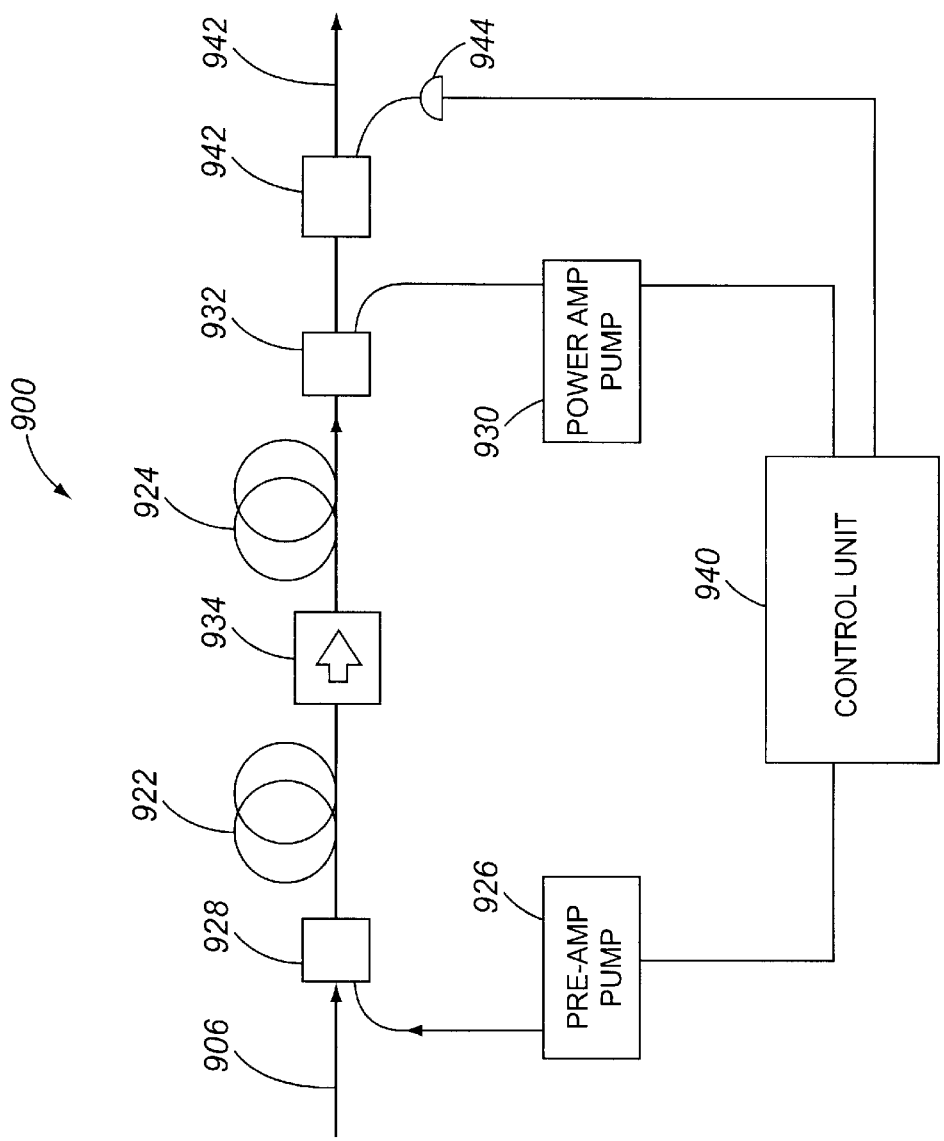
FIG. 9 schematically illustrates another embodiment of a fiber power amplifier unit according to the present invention that provides dynamic adjustment of the tilt compensation.

Another embodiment of a power amplifier unit 900 that provides dynamic gain flattening adjustment is illustrated in FIG. 9. The signal to be amplified enters the power amplifier unit 900 by way of the input 906. A pre-amplifier pump laser 926 generates pump light that is combined with the signal in combiner 928, so that both the signal and the pump light enter the fiber pre-amplifier 922. After being amplified in the fiber pre-amplifier 922, the signal typically passes through an isolator 934 and then enters the fiber power amplifier 924, which is typically counter-pumped by pump light from the power amplifier pump laser 930. The pump light from the power amplifier pump laser 930 is coupled into the fiber power amplifier 924 by combiner 932. The power amplified signal leaves the power amplifier unit 900 via the output 942.

A splitter 942 is disposed at the output 942 to tap off a fraction of the output signal, which is directed to a detector 944. The detector 944 may be any suitable detector that detects amplitude of the amplified signal, for example a photodiode. The detector 944 is coupled to the control unit 940 which controls operation of both the pump lasers 926 and 930 and the gain tilt of the fiber pre-amplifier 922. If the amplitude of the amplified signal varies, then the degree of saturation of the power amplifier 924 may vary, thus changing the positive tilt that is caused by the fiber power amplifier 924. When the control unit 940 detects a change in the amplitude of the amplified signal, the control unit 940 changes the negative tilt imposed by the fiber pre-amplifier 922 by a corresponding amount, so as to compensate for the change in the positive tilt.

The detector 944 may also detect the tilt of the amplified signal. In one embodiment, the detector 944 may include a WDM demultiplexer to separate different channels of the amplified signal, and then detect amplitudes of two or more of the different channels. For example, where there are N channels, the detector 944 may measure the amplitudes of the first and Nth channels. The ratio of the two amplitudes may be taken as a measure of the tilt of the amplified signal. It will be appreciated that the amplitudes of any combination of channels may be used as a measure of flatness of the incoming signal, for example using a channel monitor.

A change in the tilt of the amplified signal may arise, for example, from a change in the power or tilt of the signal entering the power amplifier unit 900 through the input 906. The tilt of the amplified signal may also arise from a change in the performance of a component of the power amplifier unit 900. For example, the fiber amplifiers 922 and 924 may age over time, reducing the magnitude of the population inversion achievable for a specific input pump power. The performance of the couplers 928 and 932 may degrade with time, thus reducing the amount of pump power delivered to the respective fiber amplifiers 922 and 924. Furthermore, the performance of the pump lasers 926 and 930 may change with time, for example the output power may degrade or the output wavelength may shift, thus changing the population inversion in the respective fiber amplifiers 922 and 924. The control unit 940 may change the negative tilt imposed by the fiber pre-amplifier 922 to compensate for the change in tilt of the amplified signal, thus ensuring a spectrally flat output amplified WDM signal at the output 942.

The negative tilt of the fiber pre-amplifier 922 may be changed using different approaches. In one approach, the wavelength of the pump light from the pre-amplifier pump laser 926 may be tuned relative to the erbium absorption peak at 976 nm in the fiber pre-amplifier 922, by as much as ±5 or 10 nm. For example, tuning the pre-amplifier pump laser 926 towards the absorption peak results in an increased population inversion in the fiber pre-amplifier 922 and a concomitant increase in the negative tilt. Contrariwise, tuning the fiber pre-amplifier 922 away from the absorption peak results in a reduced population inversion in the fiber pre-amplifier 922 and a concomitant reduction in the negative tilt. Any suitable methods of tuning the pre-amplifier pump laser 926 may be used, for example temperature tuning a Fabry Perot diode laser, a distributed feedback (DFB) diode laser or a distributed Bragg reflector (DBR) laser. If the pump laser 926 is grating stabilized by an external fiber Bragg grating (FBG), then the FBG may be temperature tuned or mechanically stretched to change the wavelength of operation.

Another approach to changing the negative tilt of the fiber pre-amplifier 922 is to alter the amount of pump power delivered to the fiber pre-amplifier 922 from the pre-amplifier pump laser 926. For example, the drive current delivered to the pre-amplifier pump laser 926 may be altered to change its output power. It is often preferred, however, to operate a semiconductor laser at constant current in order to maintain stable operation.

Figure 10:
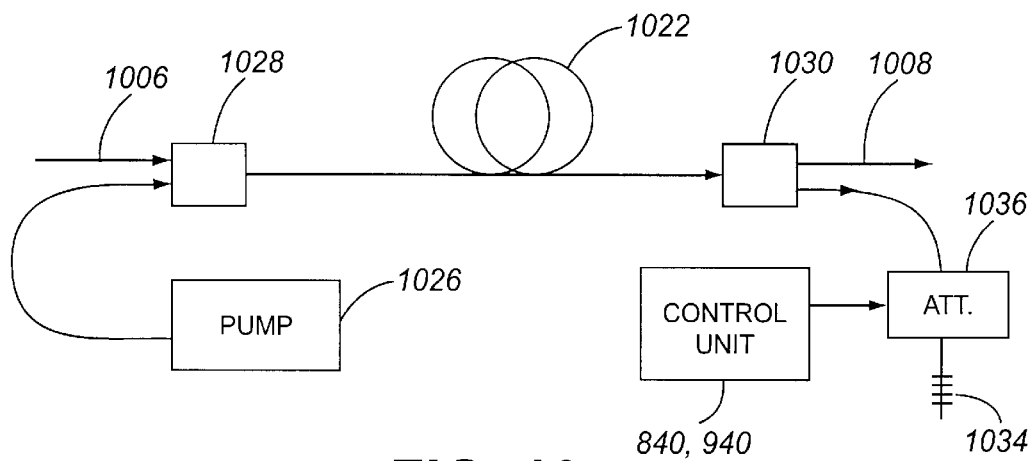
FIG. 10 schematically illustrates another embodiment of a pumping arrangement for a fiber pre-amplifier according to the present invention that provides for adjustment of the pump power delivered to the fiber pre-amplifier.

Another embodiment for changing the pump power delivered to the fiber pre-amplifier is schematically illustrated in FIG. 10. The output from the pump laser 1026 is combined in combiner 1028 with the signal to be amplified from the input 1006. The pump light and signal both pass through the fiber pre-amplifier 1022. A portion of the pump light is absorbed in the fiber pre-amplifier 1022. The transmitted pump light and the signal are separated in the splitter 1030, which may be a WDM splitter configured to separate the pump light from the signal. The signal propagates through the pre-amplifier output 1008. The pump light passes along fiber 1032 to the reflector 1034, which reflects the pump light back towards the fiber pre-amplifier 1022.

An attenuator 1036 may be disposed between the splitter 1030 and the reflector 1034 for adjusting the amount of pump light that is reflected back into the fiber pre-amplifier 1022. The attenuator 1036 may be a variable attenuator under control of the control unit 840, 940. The attenuator 1036 may be a thermo-optic switch, an electro-optic switch, an acousto-optic switch or any other suitable variable attenuator for controlling the amount of light passing to and from the reflector 1034. Reducing the amount of attenuation imposed by the attenuator 1036 increases the amount of pump light absorbed within the fiber pre-amplifier 1022, resulting in an increase in the population inversion and a concomitant increase in the negative tilt. Contrariwise, increasing the amount of attenuation imposed by the attenuator 1036 reduces the amount of pump light absorbed within the fiber pre-amplifier 1022, resulting in a decrease in the population inversion and a concomitant decrease in the negative tilt.

Figure 11:
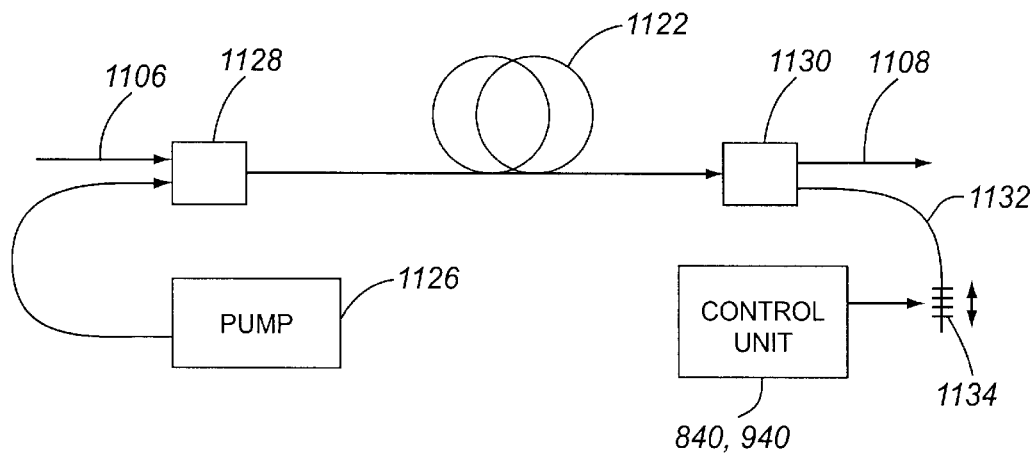
FIG. 11 schematically illustrates another embodiment of a pumping arrangement for a fiber pre-amplifier according to the present invention that provides for adjustment of the pump power absorbed in the fiber pre-amplifier.

Another embodiment for changing the pump power delivered to the fiber pre-amplifier is schematically illustrated in FIG. 11. The output from the pump laser 1126 is combined in combiner 1128 with the signal to be amplified from the input 1106. The pump light and signal both pass through the fiber pre-amplifier 1122. A portion of the pump light is absorbed in the fiber pre-amplifier 1122. The transmitted pump light and the signal are separated in the splitter 1130, which may be a WDM splitter configured to separate the pump light at around 980 nm from the signal. The signal propagates through the pre-amplifier output 1108. The pump light passes along fiber 1132 to the reflector 1134, which reflects the pump light back towards the fiber pre-amplifier 1122.

The reflectivity of the reflector 1134 may be tuned to adjust the amount of light reflected to the fiber pre-amplifier 1122. For example, if the reflector 1134 is a fiber Bragg grating, the fiber 1132 containing the fiber Bragg grating 1134 may be stretched, under control of the control unit 840, 940 to change the period of the fiber Bragg grating 1134. In one particular embodiment, the fiber Bragg grating 1134 is wound on a former whose diameter is adjustable: adjusting the former's diameter results in a change in the reflectivity peak of the grating 1134. Thus, the amount of pump light that is reflected to the fiber pre-amplifier 1122 maybe changed. Increasing the reflectivity of the fiber Bragg grating 1134 at the pump wavelength increases the amount of pump light absorbed within the fiber pre-amplifier 1122, resulting in an increase in the population inversion and a concomitant increase in the negative tilt. Contrariwise, reducing the reflectivity of the fiber Bragg grating at the pump wavelength reduces the amount of pump light absorbed within the fiber pre-amplifier 1122, resulting in a decrease in the population inversion and a concomitant decrease in the negative tilt.

While various examples were provided above, the present invention is not limited to the specifics of the examples. For example, the invention is applicable to any type of optical power amplifier system that includes a pre-amplifier and a power amplifier, where the gain tilt of the heavily inverted pre-amplifier is opposite to that of the tilt of the saturated power amplifier, and is not restricted to erbium-based amplifiers.

As noted above, the present invention is applicable to fiber optic amplifiers. While having use in many different applications, it is believed to be particularly useful in producing a spectrally flat output from a power fiber amplifier. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A fiber amplifier system having a spectral gain characteristic, comprising:
    a fiber power amplifier having an input and an output, and exhibiting a fiber power amplifier spectral gain tilt; and
    a fiber pre-amplifier having an output coupled to the input of fiber power amplifier, the fiber pre-amplifier exhibiting a fiber pre-amplifier spectral gain tilt selected to at least partially compensate for the fiber power amplifier spectral gain tilt of the fiber power amplifier, so as to flatten the spectral gain characteristic of the amplifier system, wherein the fiber pre-amplifier has a length significantly shorter than an optimum pre-amplifier length for maximum power extraction.

2. A fiber amplifier system having a spectral gain characteristic, comprising:
    a fiber power amplifier having an input and an output, and exhibiting a fiber power amplifier spectral gain tilt; and
    a fiber pre-amplifier having an output coupled to the input of fiber power amplifier, the fiber pre-amplifier exhibiting a fiber pre-amplifier spectral gain tilt selected to at least partially compensate for the fiber power amplifier spectral gain tilt of the fiber power amplifier, so as to flatten the spectral gain characteristic of the amplifier system and, a fiber power amplifier pump laser coupled to the fiber power amplifier and a fiber pre-amplifier pump laser coupled to the fiber pre-amplifier further comprising a housing containing the fiber power amplifier, the fiber pre-amplifier, the fiber power amplifier and fiber pre-amplifier pump lasers, and also containing respective drive and thermal control circuits connected to each of the fiber power amplifier and fiber pre-amplifier pump lasers, the housing further including an input port coupled to an input of the fiber pre-amplifier and an output port coupled to the output of the fiber power amplifier.

3. A fiber amplifier system having a spectral gain characteristic, comprising:
    a fiber power amplifier having an input and an output, and exhibiting a fiber power amplifier spectral gain tilt; and
    a fiber pre-amplifier having an output coupled to the input of fiber power amplifier, the fiber pre-amplifier exhibiting a fiber pre-amplifier spectral gain tilt selected to at least partially compensate for the fiber power amplifier spectral gain tilt of the fiber power amplifier, so as to flatten the spectral gain characteristic of the amplifier system, and a fiber power amplifier pump laser coupled to the fiber power amplifier and a fiber pre-amplifier pump laser coupled to the fiber pre-amplifier further comprising a gain tilt control unit connected to one of the fiber pre-amplifier pump laser and the fiber pre-amplifier unit to control the fiber pre-amplifier spectral gain tilt of the fiber pre-amplifier.

4. A system as recited in claim 3, further comprising an input optical detector disposed to detect a power level of an input light signal entering the input of the fiber pre-amplifier, wherein the gain tilt control unit adjusts the fiber pre-amplifier spectral gain tilt of the fiber pre-amplifier in response to a detection signal received from the input optical detector.

5. A system as recited in claim 3, further comprising an output optical detector disposed to detect a power level of an output light signal produced by the fiber power amplifier, wherein the gain tilt control unit adjusts the gain tilt of the fiber pre-amplifier in response to a detection signal received from the output optical detector.

6. A fiber amplifier system having a spectral gain characteristic, comprising:
    a fiber power amplifier having an input and an output, and exhibiting a fiber power amplifier spectral gain tilt; and
    a fiber pre-amplifier having an output coupled to the input of fiber power amplifier, the fiber pre-amplifier exhibiting a fiber pre-amplifier spectral gain tilt selected to at least partially compensate for the fiber power amplifier spectral gain tilt of the fiber power amplifier, so as to flatten the spectral gain characteristic of the amplifier system, and a fiber power amplifier pump laser coupled to the fiber power amplifier and a fiber pre-amplifier pump laser coupled to the fiber pre-amplifier, and wherein the fiber pre-amplifier unit includes a reflector coupled to an output from the fiber pre-amplifier to reflect pump light transmitted through the fiber pre-amplifier back to the fiber pre-amplifier.

7. A system as recited in claim 6, wherein the reflector has a reflectivity of light at the wavelength emitted by the fiber pre-amplifier pump laser that is adjustable.

8. A system as recited in claim 6, further comprising a coupler disposed between the fiber pre-amplifier and the reflector to couple pump light from the fiber pre-amplifier to the reflector.

9. A system as recited in claim 8, further comprising an attenuator disposed between the coupler and the reflector.

10. A system as recited in claim 8, further comprising a gain tilt control unit to control tilt in the fiber pre-amplifier spectral gain of the fiber pre-amplifier, wherein the attenuator is an adjustable attenuator and the gain tilt control unit is coupled to control attenuation of the attenuator.

11. A fiber amplifier system having a spectral gain characteristic, comprising:
    a fiber power amplifier having an input and an output, and exhibiting a fiber power amplifier spectral gain tilt; and
    a fiber pre-amplifier having an output coupled to the input of fiber power amplifier, the fiber pre-amplifier exhibiting a fiber pre-amplifier spectral gain tilt selected to at least partially compensate for the fiber power amplifier spectral gain tilt of the fiber power amplifier, so as to flatten the spectral gain characteristic of the amplifier system, and further comprising a plurality of output fibers coupled to the output of the fiber power amplifier.

12. A fiber amplifier system having a spectral gain characteristic, comprising:
    a fiber power amplifier having an input and an output, and exhibiting a fiber power amplifier spectral gain tilt; and
    a fiber pre-amplifier having an output coupled to the input of fiber power amplifier, the fiber pre-amplifier exhibiting a fiber pre-amplifier spectral gain tilt selected to at least partially compensate for the fiber power amplifier spectral gain tilt of the fiber power amplifier, so as to flatten the spectral gain characteristic of the amplifier system, and wherein the fiber power amplifier includes a double clad fiber having an inner core and an inner cladding surrounding the inner core, wherein an optical signal to be amplified in the power fiber amplifier propagates substantially within the inner core, and pump light for the fiber power amplifier propagates within the inner cladding and the inner core.

13. A method of operating a fiber power amplifier system having a fiber pre-amplifier coupled to a fiber power amplifier, the method comprising:
    adjusting spectral non-uniformity in the gain of the fiber pre-amplifier so as to flatten a spectral gain characteristic of the fiber power amplifier system; and
    detecting an input signal to the fiber pre-amplifier and adjusting spectral non-uniformity in the gain of the fiber pre-amplifier in response to the detected input signal, and wherein detecting an input signal includes detecting power of a wavelength division multiplexed (WDM) input signal integrated over all channels of the WDM input signal.

14. A method of operating a fiber power amplifier system having a fiber pre-amplifier coupled to a fiber power amplifier, the method comprising:
    adjusting spectral non-uniformity in the gain of the fiber pre-amplifier so as to flatten a spectral gain characteristic of the fiber power amplifier system; and
    detecting an input signal to the fiber pre-amplifier and adjusting spectral non-uniformity in the gain of the fiber pre-amplifier in response to the detected input signal, and wherein detecting an input signal includes detecting channel power for at least two channels of the WDM input signal and comparing channel power to determine tilt in the WDM input signal.

15. A method of operating a fiber power amplifier system having a fiber pre-amplifier coupled to a fiber power amplifier, the method comprising:
    adjusting spectral non-uniformity in the gain of the fiber pre-amplifier so as to flatten a spectral gain characteristic of the fiber power amplifier system; and
    detecting an input signal to the fiber pre-amplifier and adjusting spectral non-uniformity in the gain of the fiber pre-amplifier in response to the detected input signal, and further comprising detecting an output signal from the fiber power amplifier and adjusting the spectral non-uniformity in the gain of the fiber pre-amplifier in response to the detected output signal.

16. A method as recited in claim 15, wherein detecting an output signal includes detecting channel power of at least two channels of a wavelength division multiplexed (WDM) output signal.

17. A method of operating a fiber power amplifier system having a fiber pre-amplifier coupled to a fiber power amplifier, the method comprising:
    adjusting spectral non-uniformity in the gain of the fiber pre-amplifier so as to flatten a spectral gain characteristic of the fiber power amplifier system; and
    detecting an input signal to the fiber pre-amplifier and adjusting spectral non-uniformity in the gain of the fiber pre-amplifier in response to the detected input signal, and wherein adjusting the spectral non-uniformity of the gain includes reflecting pump light transmitted through the fiber pre-amplifier using a reflector and adjusting reflectivity of the reflector at an emission wavelength of a fiber pre-amplifier pump laser.

18. A method of operating a fiber power amplifier system having a fiber pre-amplifier coupled to a fiber power amplifier, the method comprising:
    adjusting spectral non-uniformity in the gain of the fiber pre-amplifier so as to flatten a spectral gain characteristic of the fiber power amplifier system; and
    detecting an input signal to the fiber pre-amplifier and adjusting spectral non-uniformity in the gain of the fiber pre-amplifier in response to the detected input signal, and wherein adjusting the spectral non-uniformity of the gain includes reflecting pump light transmitted through the fiber pre-amplifier using a reflector and adjusting attenuation of an attenuator disposed between the reflector and the fiber pre-amplifier.

19. An optical information transmission system, comprising:
    an optical transmitter;
    an optical receiver;
    an optical power amplifier unit disposed on an optical path between the optical transmitter and the optical receiver, the optical power amplifier unit including
        a fiber power amplifier having an output coupled to the optical receiver and an input, the fiber power amplifier exhibiting a first gain tilt; and
        fiber pre-amplifier having an input coupled to receive an input signal from the optical transmitter, and an output coupled to the input of the power amplifier, the fiber pre-amplifier exhibiting a second gain tilt selected to compensates for the first gain tilt so as to flatten the spectral gain characteristic of the amplifier system; and
    a free space communications link disposed between the optical power amplifier unit and the optical receiver, and further comprising a transmitting telescope disposed to receive an amplified output signal from the optical power amplifier unit and to transmit the amplified output signal into free space, and a receiving telescope disposed to receive at least a portion of the amplified output signal from free space, and to direct the at least a portion of the amplified output signal to the optical receiver, the free space communications link being formed between the transmission and receiving telescopes.

20. A fiber amplifier system, comprising:

a pump laser emitting pump light;

a pump light-absorbing fiber amplifier coupled to absorb the pump light from the pump laser, wherein the amount of pump light absorbed in the pump light-absorbing fiber amplifier is adjustable so as to control a gain tilt of the pump light-absorbing fiber amplifier; and an adjustable pump light coupler to couple light from the pump laser to the pump light-absorbing fiber amplifier, the adjustable pump coupler coupling and adjustable amount of pump light to the pump light-absorbing fiber amplifier, and wherein the adjustable pump coupler includes a coupler to couple pump light into the pump light-absorbing fiber amplifier from the pump laser and a reflector coupled to reflect light transmitted through the pump light-absorbing fiber amplifier back to the pump light-absorbing fiber amplifier, and wherein the reflectivity of the reflector is adjustable at the wavelength of the pump light.

21. A fiber amplifier system, comprising:

a pump laser emitting pump light;

a pump light-absorbing fiber amplifier coupled to absorb the pump light from the pump laser, wherein the amount of pump light absorbed in the pump light-absorbing fiber amplifier is adjustable so as to control a gain tilt of the pump light-absorbing fiber amplifier; and an adjustable pump light coupler to couple light from the pump laser to the pump light-absorbing fiber amplifier, the adjustable pump coupler coupling and adjustable amount of pump light to the pump light-absorbing fiber amplifier, and wherein the adjustable pump coupler includes a coupler to couple pump light into the pump light-absorbing fiber amplifier from the pump laser and a reflector coupled to reflect light transmitted through the pump light-absorbing fiber amplifier back to the pump light-absorbing fiber amplifier, and further comprising an attenuator, having an adjustable attenuation, disposed between the pump light-absorbing fiber amplifier and the reflector.

22. A fiber amplifier system, comprising:

a pump laser emitting pump light;

a pump light-absorbing fiber amplifier coupled to absorb the pump light from the pump laser, wherein the amount of pump light absorbed in the pump light-absorbing fiber amplifier is adjustable so as to control a gain tilt of the pump light-absorbing fiber amplifier; and an adjustable pump light coupler to couple light from the pump laser to the pump light-absorbing fiber amplifier, the adjustable pump coupler coupling and adjustable amount of pump light to the pump light-absorbing fiber amplifier, and wherein the adjustable pump coupler includes a coupler to couple pump light into the pump light-absorbing fiber amplifier from the pump laser and a reflector coupled to reflect light transmitted through the pump light-absorbing fiber amplifier back to the pump light-absorbing fiber amplifier, and wherein the pump light-absorbing fiber amplifier is substantially shorter than an optimized length for optimized signal gain in the pump light-absorbing fiber amplifier.

\* \* \* \* \*

UNITED STATES PATENT AND TRADEMARK OFFICE
CERTIFICATE OF CORRECTION

PATENT NO. : 6,603,896 B1
DATED : August 5, 2003
INVENTOR(S) : MacCormack et al.

It is certified that error appears in the above-identified patent and that said Letters Patent is hereby corrected as shown below:

Column 7,
Line 7, "is approximately 1 times" should read -- is approximately $10^4$ times --

Signed and Sealed this

Sixth Day of April, 2004

JON W. DUDAS
*Acting Director of the United States Patent and Trademark Office*